US005778232A

United States Patent [19]
Caldwell et al.

[11] Patent Number: 5,778,232
[45] Date of Patent: Jul. 7, 1998

[54] AUTOMATIC COMPILER RESTRUCTURING OF COBOL PROGRAMS INTO A PROC PER PARAGRAPH MODEL

[75] Inventors: Jeffrey B. Caldwell, Sunnyvale; Harry Charles Muttart, Cupertino; David Henry Gross, Campbell, all of Calif.

[73] Assignee: Hewlett-Packard Company, Palo Alto, Calif.

[21] Appl. No.: 675,174

[22] Filed: Jul. 3, 1996

[51] Int. Cl.$^6$ .................................................. G06F 9/45
[52] U.S. Cl. ........................................ 395/707; 395/709
[58] Field of Search ................................. 395/705, 707, 395/709, 500

[56] References Cited

U.S. PATENT DOCUMENTS

| | | | |
|---|---|---|---|
| 4,567,574 | 1/1986 | Saade et al. | 364/900 |
| 4,649,480 | 3/1987 | Ohki et al. | 395/709 |
| 5,193,190 | 3/1993 | Janczya et al. | 395/700 |
| 5,428,793 | 6/1995 | Odnert et al. | 395/700 |
| 5,535,394 | 7/1996 | Burke et al. | 395/700 |
| 5,577,253 | 11/1996 | Blickstein | 395/705 |

OTHER PUBLICATIONS

"Incremental Global Optimization for Faster Recoupilations", Pollock L.L. et al., Int'l Comference on Computer Languages, pp. 281–290, Mar. 1990.

"The Influence of Language Semantics on Program Slicing", Hwang J. C. et al., Proc. Int'l Conference on Comp. Languages, pp. 120–127, Oct. 1988.

"Region –Based Compilation: An Introduction and Motivation", Hank R. E. et al., Proceedings of the MICRO–28, pp. 158–168, Dec. 1995.

"Object –Oriented COBOL Recycling", Sneed H. M., Proceedings of the WCRE '96, pp. 169–178, Nov. 1996.

"Interprocedural Analysis vs. Procedure Integration", Richardson S. et al., Information Processing Letters, v32, n3, pp. 137–142, Aug. 1989.

"Using Profile Information to Assist Classic Code Optimizations", Chang P. P. et al., Soft–Practice and Experience, v21 n 12, pp. 1301–1321, Dec. 1991.

Primary Examiner—Edward R. Cosimano
Assistant Examiner—Kakali Chaki

[57] ABSTRACT

A compiler for compiling and optimizing a COBOL program. The invention is embodied in a front end that reads the COBOL program and generates an intermediate representation that can be optimized by later stages of the compiler. After reading the COBOL program, the compiler first coalesces the paragraphs into procedures. If a paragraph's preceding paragraph is not a potential exit point, then the paragraphs are coalesced. Next, the basic block counts of the procedures are estimated. If a basic block count exceeds a predetermined limit, then basic blocks are sliced from the procedure, placed into a new procedure, and a call to the new procedure is inserted into the sliced procedure. Finally, the compiler generates a super-procedure from the sliced procedures. The super-procedure implements the control flow of the original COBOL program. Because the resulting program behavior resembles that of a C, C++, or Fortran program, the compiler can use C, C++, or Fortran compiler technology to optimize the COBOL program.

20 Claims, 5 Drawing Sheets

AUTOMATIC COMPILER RESTRUCTURING OF COBOL PROGRAMS INTO A PROC PER PARAGRAPH MODEL

TECHNICAL FIELD OF THE INVENTION

This invention relates generally to compiler design and more particularly to a system and method of restructuring the control flow of a COBOL application to allow an optimizing compiler to perform more effective optimizing code transformations.

BACKGROUND OF THE INVENTION

As discussed by Pratt, "Programming Languages Design and Implementation," Prentice Hall, Inc., 1975, pp. 360–84, which is hereby incorporated by reference, COBOL is a high-level language used primarily for business applications of computers.

A COBOL program can be described as a series of statements grouped into constructs called paragraphs. Paragraphs may, in turn, be grouped into constructs called sections. Standard control flow in a COBOL program starts execution at the first paragraph. When execution of the first paragraph is completed, control flow then enters the next paragraph.

This standard control flow can be changed by use of the GO TO and PERFORM statements. A GO TO statement transfers control flow to the beginning of a paragraph. A PERFORM statement also transfers control to the beginning of a paragraph. A PERFORM statement differs from a GO TO statement in that when the paragraph end is reached, control flow is returned to the statement following the PERFORM statement provided that this is the last paragraph that was PERFORMed. The PERFORM statement is implemented using a stack.

The structure of COBOL programs is significantly different than that of other, more common programming languages such as C, C++, and Fortran. Because those languages are more popular for new application development, current advances in industry optimization techniques are C, C++, and Fortran-centric. SPEC benchmarks and academic research in the field of compiler optimizations, for example, are based on C, C++, and Fortran. Therefore, the more a program looks like C, C++, or Fortran, the better the performance results that a program will receive from industry optimization technology.

In addition, most system code is written in C or C++. Accordingly, as new architectures appear, code generation and optimization for C is the first implemented. The fewer non-C features that are used in a compiler front-end, the earlier in the development process it can be supported by the code generator. Moreover, industry optimization efforts have limited resources. Because C, C++, and Fortran are more popular than COBOL, many optimization techniques are not even implemented for COBOL systems.

Furthermore, current industry Low Level Optimizer technology performs transformations on a program code stream on a procedure by procedure basis. Optimization processing time grows geometrically based on the size of a procedure. If a procedure is too large, the memory and time requirements of an optimizer prohibit the effective optimization of the procedure. If a procedure is too small, the effectiveness of the Low Level Optimizer is restricted because the scope of instructions on which it may operate is too small to be effective. Therefore, allowing a compiler to have explicit control over the size of any given procedure is useful.

Accordingly, there is a need in the art for a system and method for altering COBOL program structure to appear to optimization technology is if COBOL programs were common C, C++, or Fortran programs.

There is also a need in the art for a system and method for customizing the size of procedures passed to a Low Level Optimizer in order to allow efficient optimization without memory overflow.

There is yet another need in the art for a system and method to customize the size of procedures to provide a larger range of instructions for an optimizer to schedule.

SUMMARY OF THE INVENTION

The above and other needs are met by a system and method of compiling a COBOL program that removes all paragraph calls and inter-paragraph GO TOs from the program. In place of these constructs, the invention uses conventional procedure calls and returns.

The present invention is preferably embodied in a compiler front-end. The compiler front-end takes COBOL source code as input and outputs an intermediate representation of the code that more closely follows the structure of C, C++, and Fortran programs. The intermediate representation can then be processed by other optimizers and compilers for eventual conversion to machine instructions in an object file.

The inventive front-end follows three distinct steps to transform the COBOL code: 1) paragraph coalescing; 2) procedure slicing, also called producer chunking; and 3) creation of a super procedure. The first step, paragraph coalescing, combines adjacent paragraphs where possible. This combination creates a larger block of instructions for the optimizer to schedule across, resulting in more effective latency hiding and intra-procedural dataflow analysis. Briefly, paragraph coalescing is a process performed by starting with the last paragraph in the Procedure-Division and working backwards. Any paragraph that is a potential return point of a PERFORM is combined with each predecessor paragraph until one of the predecessor paragraphs is determined to be a potential return point. Then, the process is repeated until all paragraphs are coalesced.

By placing more than one paragraph in a procedure, paragraph coalescing produces many basic blocks per procedure. A basic block is a sequence of machine instructions with a single starting point and ending point such that when the first instruction is executed, it is guaranteed that no branches will be executed before the last instruction is executed. Most compilers, however, have a limit as to the number of basic blocks that a procedure may have in order to perform effective optimization.

The inventive front-end controls the number of basic blocks in a procedure by tracking the approximate number of basic blocks in a coalesced procedure and implementing procedure slicing. Procedure slicing, the second step, removes sections of a procedure, creates new procedures consisting of the removed sections of the original procedure, and replaces the original code with calls to the appropriate newly created procedures.

In the third step, the inventive front-end creates a super procedure, or super-proc. A super-proc implements standard COBOL control flow through paragraphs with no PERFORMs or GO TOs. A PERFORM is implemented as a call to the super-proc, which corresponds to a push onto the PERFORM stack; a return from the super-proc corresponds to a pop of the PERFORM stack. A GO TO is performed either by returning a continuation index to the most recent super-proc invocation or by a direct jump within a coalesced procedure.

A technical advantage of the present invention is that it eliminates the use of a PERFORM stack and its associated code instructions by transforming paragraph calls and returns into procedure calls with explicit return points. This transformation allows use of the standard system stack instead of the historical use of a separate PERFORM stack; as a result, COBOL control flow is altered to appear to the optimizer as a C, C++, or Fortran program, which enables better optimization.

Another technical advantage of the present invention is that it combines appropriate paragraphs that have sequential COBOL control flow fall through into a single procedure. The fall through is then implicitly implemented and the instructions required for end of paragraph return processing are eliminated.

Yet another technical advantage of the present invention is to allow customization of the size of procedures passed to the Low Level Optimizer to allow more effective use of standard industry global intra-procedural optimizations and to control the amount of time and dynamic memory required to optimize COBOL programs.

A further technical advantage of the present invention is to allow COBOL programs to benefit from recent and future innovations in compiler optimization technology.

A corresponding technical advantage of the present invention is to allow more effective optimizing code transformations to be performed by optimizing compilers.

A further technical advantage of the present invention is it increases the maximum size of a program that can be compiled and improves the compile speed of large programs by customizing the compiler's memory usage on a per procedure basis.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes as the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Figure 1:
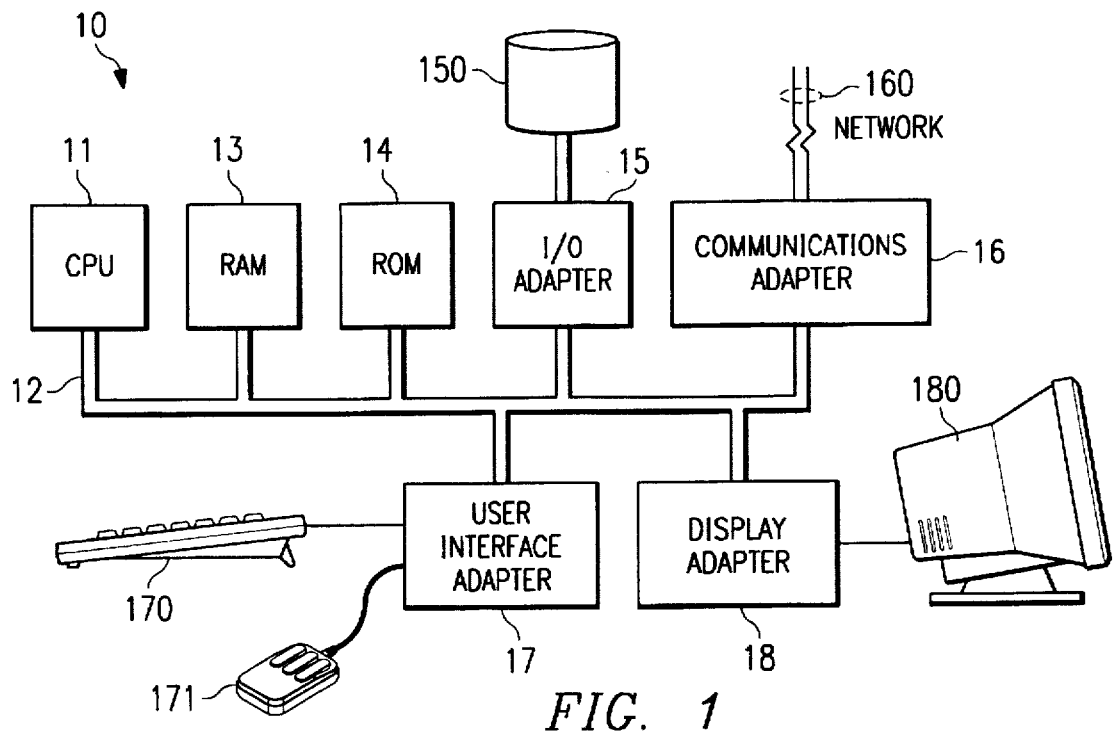
FIG. 1 illustrates a computer system adapted to execute the present invention.

FIG. 1 illustrates computer system 10 adapted to execute the present invention. Central processing unit (CPU) 11 is coupled to bus 12, which in turn is coupled to random access memory (RAM) 13, read only memory (ROM) 14, input/output (I/O) adapter 15, communications adapter 16, user interface adapter 17, and display adapter 18.

CPU 11 may be any general purpose CPU, such as a HP PA-8000. CPU 11 preferably has a reduced instruction set (RISC) architecture and supports 64-bit data words. However, the present invention is not restricted by the architecture of CPU 11. Thus, the present invention can be adapted to work with other reduced or complex instruction set computers supporting, for example, 32 or 128-bit data.

RAM 13 and ROM 14 hold user and system data and programs as is well known in the art. I/O adapter 15 connects storage devices, such as hard drive 150, to the computer system. Communications adaptor 16 couples the computer system to a local or wide-area network 160. User interface adapter 17 couples user input devices, such as keyboard 170 and pointing device 171, to the computer system. Finally, display adapter 18 is driven by CPU 11 to control the display on display device 180. As is well known in the art, an optimizing compiler embodying the present invention preferably resides on hard drive 150 and executes on CPU 11.

Figure 2:
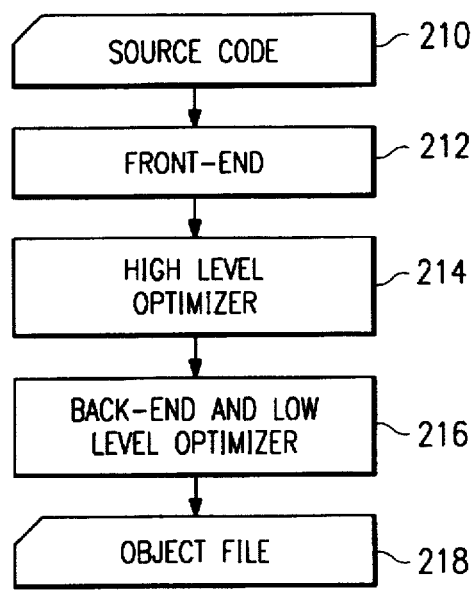
FIG. 2 is a flow chart illustrating an overview of a compiler structure according to the present invention.

FIG. 2 is a flow chart illustrating the general structure of a compiler system according to the present invention. COBOL source code 210 is written by a programmer and typically saved to a data file on hard drive 150. Next, the data file is input to compiler front end 212. Front end 212 transforms the code into an intermediate representation, which is then input to high level optimizer 214. High level optimizer 214 again transforms the code and outputs the resulting intermediate representation to back end and low level optimizer 216. Optimizer 216 produces machine instructions which are saved in object file 218 for eventual linking and execution.

The present invention preferably resides in front end 212 and transforms the COBOL source code 210 into an intermediate representation allowing more effective optimization to be performed by optimizers 214 and 216. As mentioned above, the inventive front-end follows three distinct steps to transform the COBOL code: 1) paragraph coalescing; 2) procedure slicing, also called producer chunking; and 3) creation of a super procedure. Each step is discussed in detail below.

Paragraph Coalescing

Due to the relatively small size of COBOL procedures in a typical COBOL application, the paragraph level may be too small a granularity to map to procedures. To address this issue, the present invention combines adjacent paragraphs where possible. This combination allows a larger block of instructions for the optimizer to schedule across which enables more effective latency hiding and intra-procedural analysis.

As is well known in the art, a COBOL program uses a stack, called the "perform stack" to track the return address of paragraphs executing PERFORM statements. Each time a PERFORM statement is executed, the return address of the calling paragraph is pushed onto the perform stack. When execution of the PERFORMed paragraph is completed, a return address is popped from the perform stack. Execution then resumes at the return address.

A paragraph is not coalesced with its preceding paragraph if the preceding paragraph can result in a pop of the COBOL perform stack. This rule is necessary to maintain a single, well defined return point on which the optimizer will operate, and to allow the super-proc (discussed below) to properly manage a conceptual perform stack. All other paragraphs can be coalesced.

Once coalesced, the actual implementation of the perform stack is embodied in the standard system stack within computer system 10 while the conceptual implementation of the perform stack is embodied in invocations of the super-proc. Therefore, any paragraph with an end point that is a potential perform return point must return processing back to the super-proc to determine appropriate actions. If this return were not done, then it would be necessary to pass additional state information into every call of a procedure indicating when and whether the procedure should return.

Figure 3:
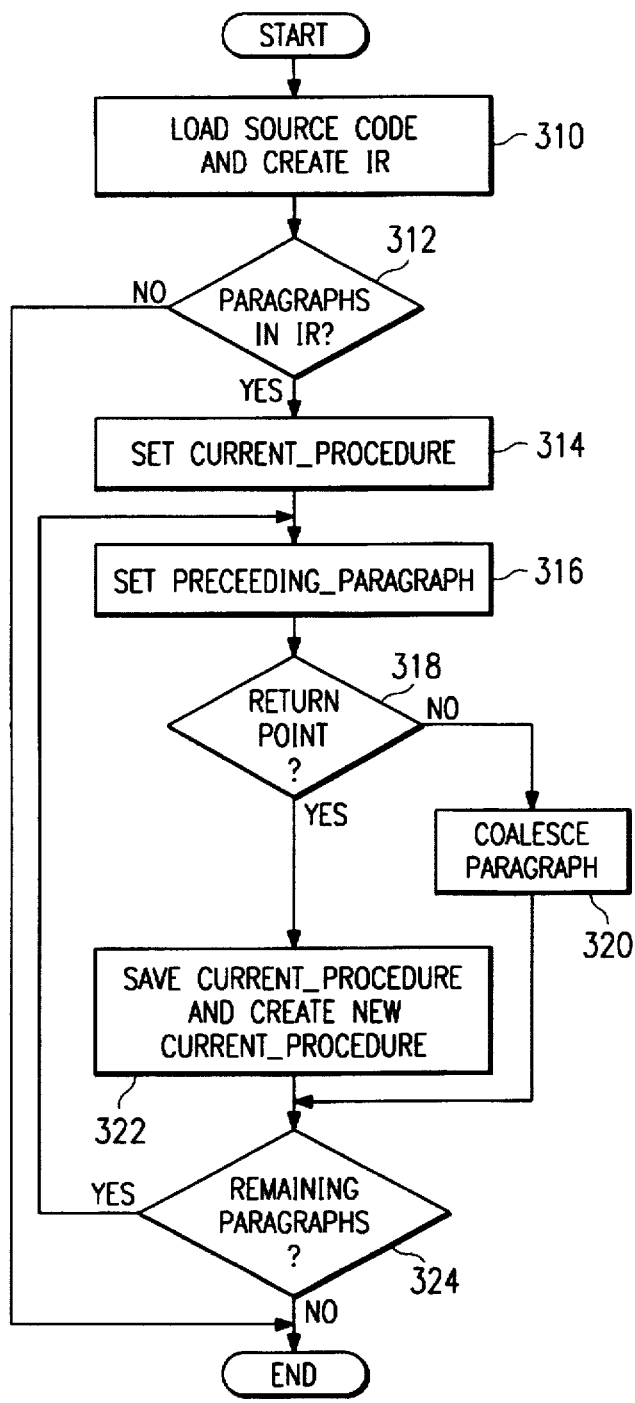
FIG. 3 is a flow chart illustrating paragraph coalescing.

FIG. 3 is a flow chart illustrating the paragraph coalescing function. At step 310, the Compiler reads the entire COBOL program and translates the program into an internal representation ("IR"). At step 312, the Compiler checks to see if there are any unprocessed paragraphs in the IR. If there are no more paragraphs, the Compiler is finished with the paragraph coalescing phase.

Otherwise, the Compiler examines the last unprocessed paragraph in the IR by setting an internal variable, CURRENT_PROCEDURE, equal to the last paragraph (step 314). The current procedure will consist of a single entry point which represents the starting point of the single paragraph that has been used to create the CURRENT_PROCEDURE.

Next, the Compiler sets the variable PRECEDING_PARAGRAPH equal to the paragraph immediately preceding the CURRENT_PROCEDURE paragraph (step 316). At step 318, the Compiler determines whether this preceding paragraph is a potential return point. A potential return point is a point that can result in a pop of the conceptual perform stack.

If the preceding paragraph is not a potential return point, then the Compiler coalesces it into the current procedure (step 320). As preceding paragraphs are coalesced into the current procedure, the primary entry point is changed to an alternate entry point in the current procedure and the newly coalesced paragraph becomes the new primary entry point.

If the preceding paragraph is a potential return point (step 322), then coalescing into a CURRENT_PROCEDURE is completed. At this step, the CURRENT_PROCEDURE will be a procedure with a single exit point, a single primary entry point, and zero or more alternate entry points. The primary entry point will be the beginning of the paragraph last coalesced into the CURRENT_PROCEDURE. Each alternate entry point corresponds to the beginning of the other paragraphs in the current procedure. At the end of step 322, CURRENT_PROCEDURE is set to the preceding paragraph, if any. Next, the Compiler moves to step 324, where it determines whether the IR contains any more paragraphs to be processed. If so, the Compiler returns to step 316.

Figure 4:
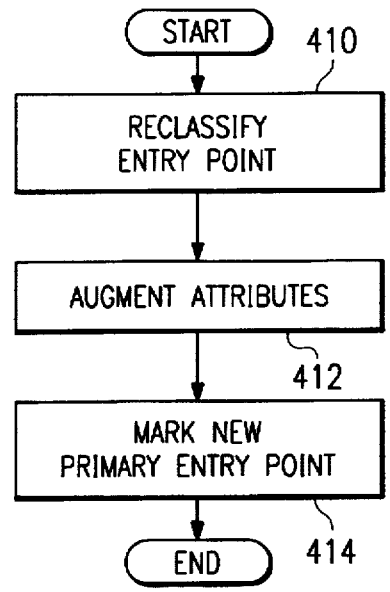
FIG. 4 is a flow chart illustrating further details of paragraph coalescing.

The process of coalescing paragraphs is illustrated in the flow chart of FIG. 4. At step 410, the current primary entry point in the CURRENT_PROCEDURE is reclassified as an alternate entry point. Next, at step 412, the attributes of the CURRENT_PROCEDURE are augmented to indicate the preceding paragraph is part of the CURRENT_PROCEDURE. At step 414, the beginning of the newly coalesced paragraph (the preceding paragraph) is marked as the primary entry point into the CURRENT_PROCEDURE.

Applying the method of FIG. 3 to a COBOL program causes only certain types of paragraphs to be coalesced. If a paragraph is not the target of any GO Tos or PERFORMs, then it is always sequentially executed by the standard COBOL paragraph control flow and can be coalesced with its predecessor. In this case, the only path into the paragraph is by paragraph fall through from its predecessor paragraph.

If a paragraph's predecessor is the target of a GO TO, but not PERFORMs, and not the second argument of a PERFORM THROUGH, and not the last paragraph in a section that is target of PERFORM, and not the last paragraph in a section that is the second argument of a PERFORM THROUGH, then it will never return to a PERFORM statement; therefore, it can be coalesced into the following paragraph. As discussed below, control flow through a GO TO is implemented by returning to the most recent super-proc frame with a "continuation" return value; the super-proc then dispatches to the target of the GO TO in its switch statement.

If a paragraph's predecessor is the target of GO Tos and/or PERFORM THROUGHs, but not a simple PERFORM, and not the last paragraph that is the target of a PERFORM, and not the last paragraph in a section that is the second argument of PERFORM THROUGH, then it is not a potential return point and can be coalesced. The target of a PERFORM THROUGH is not a return point.

A paragraph that is the target of a simple PERFORM statement is not coalesced with a preceding or subsequent paragraphs. For reasons described above, such a paragraph must have a single, well-defined return point back to the super-proc which implicitly maintains the perform stack.

A paragraph that is the second operand of a PERFORM THROUGH can be coalesced with preceding paragraphs but cannot be coalesced with any subsequent paragraphs. This rule is necessary because the paragraph is a PERFORM return point. The most recent invocation of the super-proc must determine if an actual return and "pop" of the perform stack is necessary.

Procedure Slicing

Most industry optimizers have a limit to the number of basic blocks that a procedure may have in order to perform effective optimization. Due to the relatively small size of paragraphs in a typical COBOL application, the coalescing process model will probably not result in unduly large procedures. However, paragraph coalescing and a few rare application situations may result in a procedure too large to allow effective processing by optimizer 216.

Accordingly, the present invention controls the number of basic blocks in a procedure by tracking the approximate number of basic blocks during front-end processing and implementing "procedure-slicing." Procedure slicing removes sections of a procedure, creates new procedures consisting of the removed sections of the original procedure, and replaces the original code with calls to the appropriate newly created procedures.

Because the size of the removed, or sliced, section is large, the incremental cost of the procedure call and return will be more than recovered by the benefits of effective optimization and scheduling of the new procedures. Moreover, all COBOL variables are global and, therefore, it is not necessary to pass references to any local variables into a procedure slice. However, procedure call overhead cannot be completely ignored. Therefore, slicing is performed only when necessary and special care is taken to avoid slicing inner loops as procedure call overhead in an inner loop will have an adverse effect on performance since this would negate the benefits of loop level transformations made by an optimizer.

In general, procedure slicing is done by first estimating the number of basic blocks in a coalesced procedure. If number of basic blocks is above a predetermined limit, then sections of code are sliced and placed into new procedures. If slicing is required, then the Compiler first examines loops, from the outermost loop inward, to see if an entire loop and its control code consists of a large number of basic blocks and must be sliced. Then, the Compiler examines normal in-line code for slicing. Once a section of code is selected for slicing, it is put into a new procedure and the original code is replaced with a call to the newly created procedure.

Special steps must be taken when estimating the basic block count of conditional blocks and loops. EVALUATE and GO TO ... DEPENDING clauses are first converted to IF-THEN-ELSE statements. The groups of instructions that are conditionally executed within an IF or ELSE clause are called "conditional blocks." The basic block count for a conditional block is assigned to the IF or ELSE statement preceding the block and includes the summation of all instructions within the block. Similarly, the basic block count for a loop includes the summation of all instructions within the loop. Only the total basic block count for any nested conditional block or loop is included in the total basic block count for an enclosing conditional block.

Figure 5:
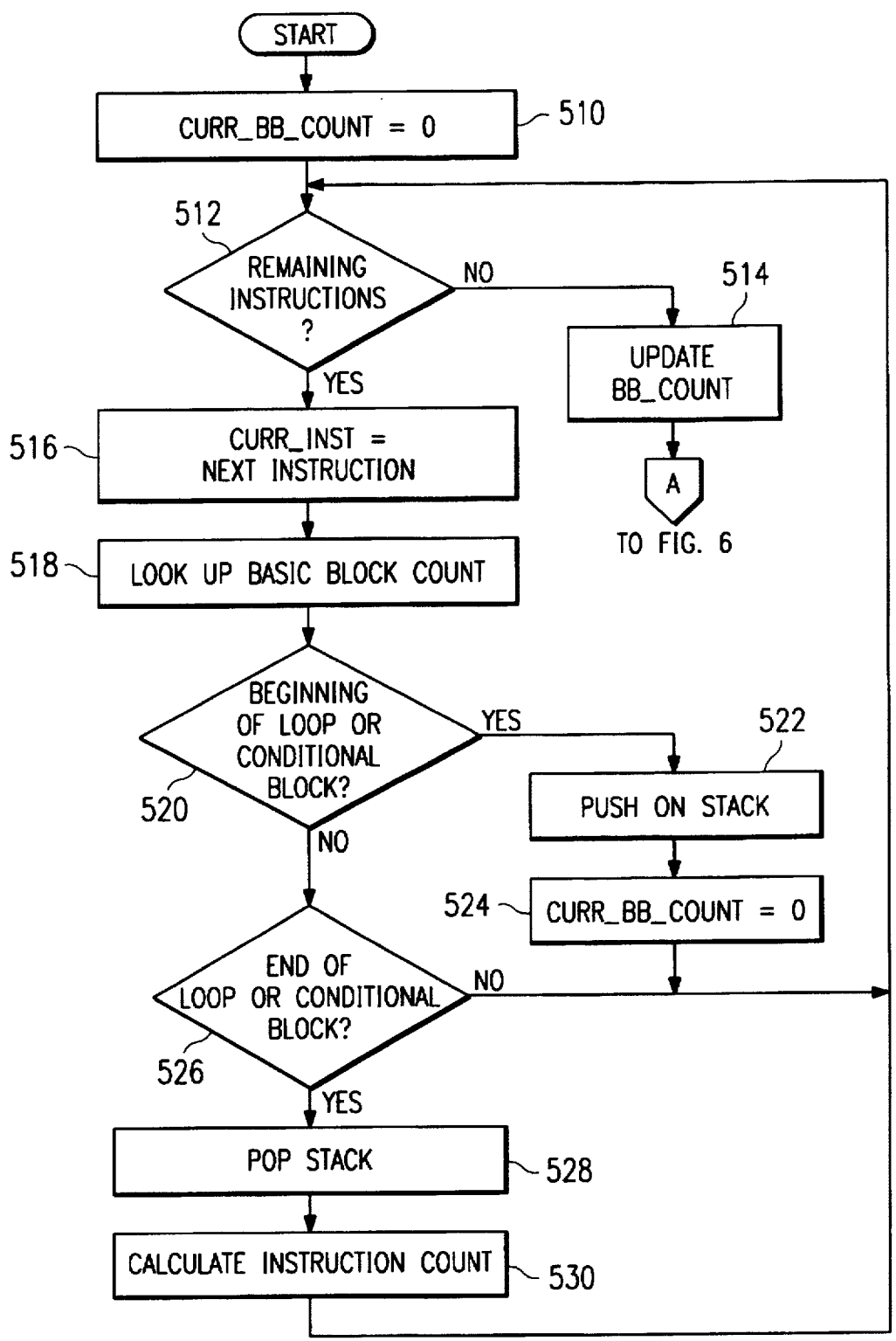
FIG. 5 is a flow chart illustrating procedure slicing.
Figure 6:
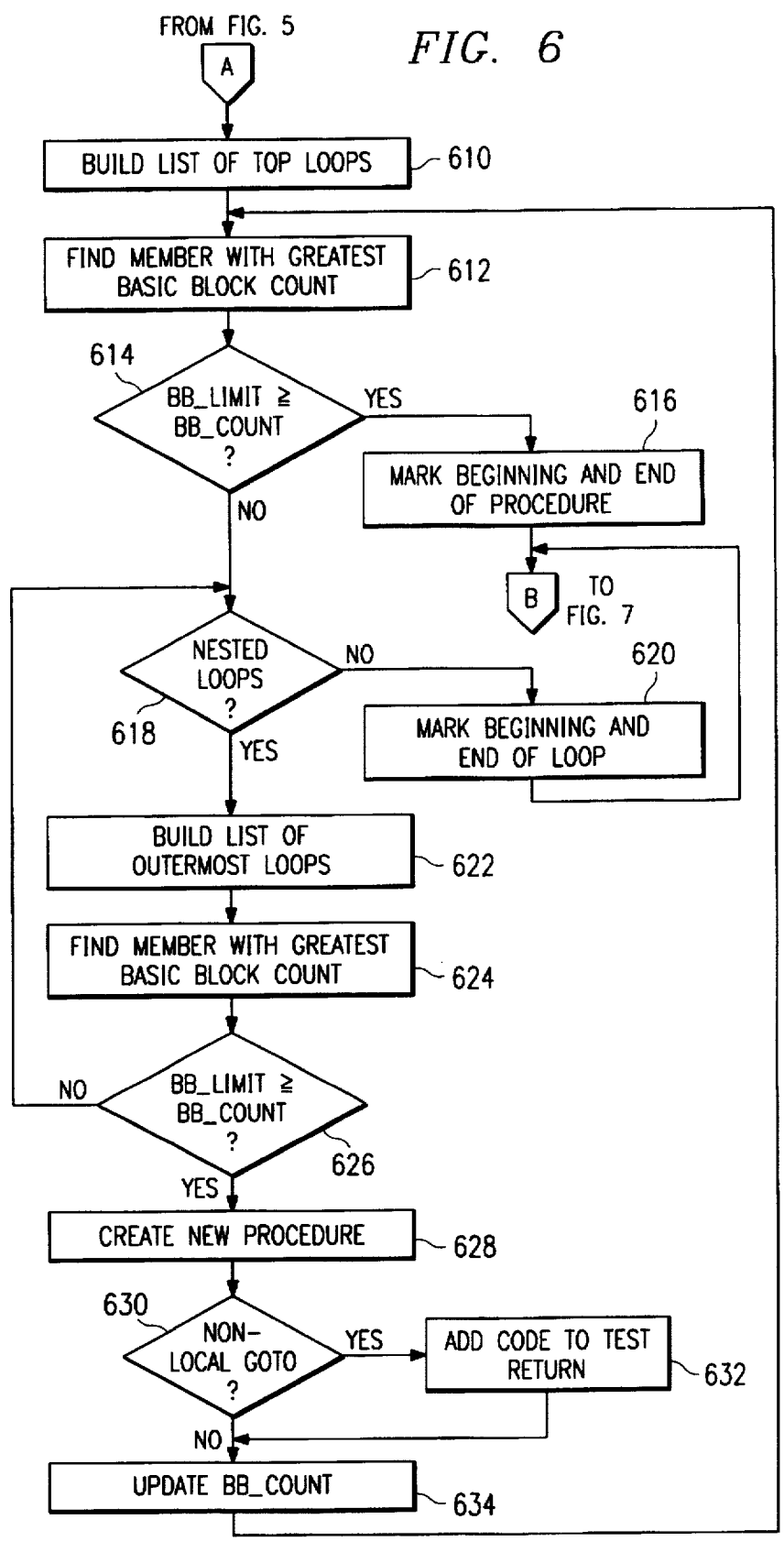
FIG. 6 is a flow chart illustrating loop slicing.
Figure 7:
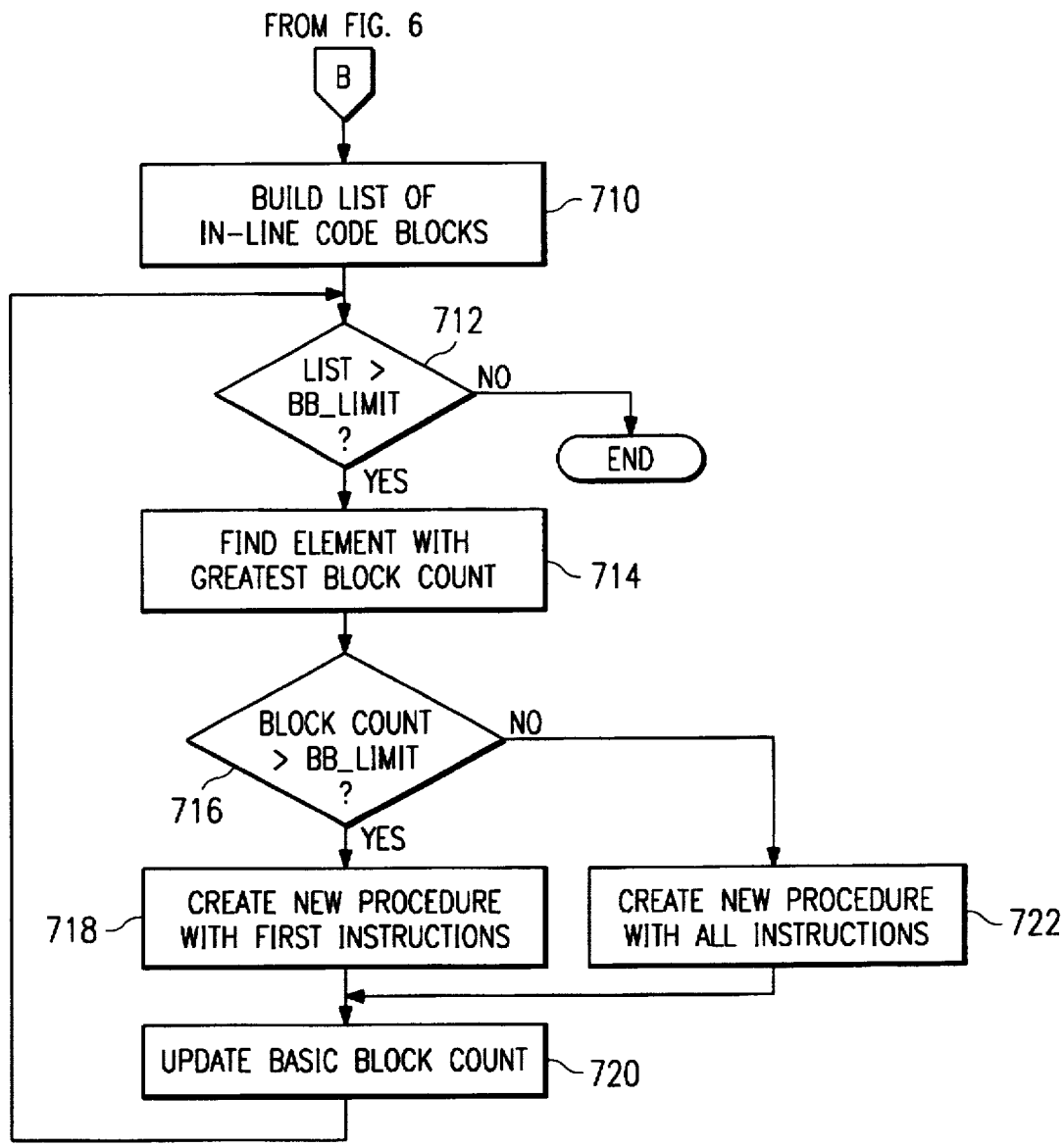
FIG. 7 is a flow chart illustrating in-line code slicing.

FIGS. 5-7 explain this process in detail. The Compiler recognizes that many COBOL instructions will result in more than one basic block in the final generated machine code. This is a glossary of the abbreviations and variables used in the figures:

- BB_LIMIT: The number of basic blocks at which optimization is determined to take too much time or space. This value is a constant determined by the architecture of optimizer 216.
- CURR_BB_COUNT: Scalar value. Tracks the current number of basic blocks in an area.
- PREV_BB_COUNT: The basic block portion of a pair popped from the NEST_STACK.
- BB_CURR: Scalar value. Holds the basic block count of the CURR_INST.
- OUTER_INST: The instruction portion of a pair popped from the NEST_STACK.
- CURR_INST: The current instruction in the code stream being processed. This is a record. Each record has a BB_COUNT field.
- NEST_STACK: Stack which holds pairs - a pointer to an instruction and a basic block count. Used to support nested loops and conditional blocks.
- BB_TABLE: A table containing a scalar basic block value estimate for each instruction type.

FIG. 5 illustrates the basic block counting aspect of the procedure slicing process. At step 510, the current number of basic blocks in the code stream graph of the current procedure is initialized to zero. At step 512, the Compiler determines whether the code stream has any remaining unprocessed instructions. If there are no remaining instructions, then the basic block count is saved (step 514) and the Compiler begins loop counting.

Otherwise, the Compiler sets the current instruction to the next instruction in the code stream (step 516). At step 518, the Compiler looks up the current instruction in the BB_TABLE to determine the current instruction's block value estimate. Then, this estimate is added to the block count for the current procedure and assigned to the BB_COUNT field of the CURR_INST record.

If the current instruction is the beginning of a loop or conditional block (step 520), then CURR_BB_COUNT and a pointer to CURR_INST are pushed onto NEST_STACK at step 522. Then, at step 524, CURR_BB_COUNT is reinitialized to zero and the Compiler returns to step 512, where it will begin processing instructions inside the loop or conditional block.

If the current instruction is the end of a loop or conditional block (step 526), then NEST_STACK is popped (step 528). After the pop, OUTER_INST is set equal to the popped CURR_INST pointer and PREV_BB_COUNT is set equal to the popped CURR_BB_COUNT value. At step 530, the BB_COUNT field of OUTER_INST is set equal to CURR_BB_COUNT. CURR_BB_COUNT is incremented by PREV_BB_COUNT. The process then returns to step 512.

FIG. 6 illustrates the steps followed when procedure slicing a loop. At step 610, the Compiler builds a list of all loops at the outmost level of the procedure. This list is called TOP_LEVEL_LOOPS. Next, at step 612, the process identifies the member of TOP_LEVEL_LOOPS that has the greatest basic block count. Then, CURR_LOOP is set equal to this member and BB_COUNT is set equal to the basic block count of CURR_LOOP.

Next, BB_COUNT is compared with BB_LIMIT (step 614). If BB_LIMIT is greater or equal, then SLICE_BEGIN is set equal to the beginning of the procedure and SLICE_END is set equal to the end of the procedure (step 616). Then, the in-line code slicing is also invoked (FIG. 7).

If BB_COUNT is larger than BB_LIMIT, then the Compiler goes to step 618. In step 618, the Compiler determines whether CURR_LOOP contains a nested loop (step 618). If not, then the Compiler continues to step 620. Otherwise, the Compiler process builds a list, LOOP_LIST, of all outermost loops nested within CURR_LOOP (step 622). Then, at step 624, the Compiler determines the member of LOOP_LIST having the greatest basic block count and sets CURR_LOOP to this member. Next, BB_COUNT is set to the block count of CURR_LOOP.

At step 626, BB_COUNT is compared with BB_LIMIT. If BB_LIMIT is larger, then the Compiler creates a new procedure consisting of the loop, including the loop head and tail code. (step 628). Then, the loop in the code stream graph is replaced with a call to the new procedure. To support non-local GO Tos (a GO TO with a target which does not fall within the current coalesced procedure), it is necessary to determine if the new procedure contains a non-local GO TO. If it does, then a test in the code stream graph is added immediately after the call which will test the return value of the new procedure (step 632). If the return value is non-0, then the code stream executes a return to its caller, passing the return value of the new procedure. This return value is called a "continuation". Next, at step 634, the BB_COUNT of each enclosing loop node in the code is updated by subtracting the basic block count of the loop just removed. In addition, the appropriate elements of TOP_LEVEL_LOOPS are similarly updated. Finally, the Compiler returns to step 612.

FIG. 7 illustrates the steps followed when slicing in-line code. At step 710, the Compiler builds a list, BLOCK_LIST, of all in-line blocks of code. An in-line block of code consists of a sequential set of instructions which does not contain an if-block, else-block, or loop. The list is built from the code flow graph and is defined by SLICE_BEGIN and SLICE_END.

Next, the Compiler counts the number of basic blocks in the current procedure (step 712). If this number is less than BB_LIMIT, then the Compiler is done. Otherwise, the Compiler moves to step 714 and finds the element of BLOCK_LIST with the greatest basic block count, CURR_BLOCK.

If the basic block count of CURR_BLOCK is greater than BB_LIMIT (step 716), then the Compiler creates a new procedure consisting of the first instructions in CURR_BLOCK (step 718). In creating the new procedure, the Compiler uses as many instructions as needed such that the total basic block count of the new procedure is as close to but not greater than BB_LIMIT. Then, the corresponding instructions in the code stream graph are replaced with a call to the new procedure. Next, at step 720, the basic block count of CURR_BLOCK is updated.

If BB_LIMIT is greater than the base block count of CURR_BLOCK, then the process creates a new procedure consisting of all instructions in CURR_BLOCK (step 722). Then, all of the instructions in the code stream graph are replaced with a call to the new procedure. Next, the Compiler moves to step 720 which reduces the basic block count of CURR_BLOCK to reflect the effect of the instructions sliced in step 718 or 722. After step 720, the process returns to step 712.

Super-Proc

When processing a Procedure-Division, the compiler will generate a "super-proc" which consists of sequential calls to each procedure in the COBOL Procedure-Division. Execution of a COBOL Procedure-Division will transfer control to the super-proc, which will sequentially call each procedure. This technique supports standard sequential control flow through a COBOL Procedure-Division.

A control flow alteration resulting from an inter-procedure GO TO statement results in a return to the super-proc with an index identifying a paragraph to which control should be transferred. This index is referred to as a "continuation." An intra-procedure GO TO (a jump to the head or body of the current procedure) is implemented as an unconditional jump within the current procedure. Since multiple paragraphs may be coalesced into a single procedure, many GO Tos may be implemented with direct jumps.

A control flow alteration resulting from a PERFORM statement is either translated into a direct procedure call to the entry point representing the PERFORMed paragraph or into a call to the super-proc. A control flow alteration resulting from a PERFORM statement can be translated into a direct procedure call for target procedures that are well-behaved. A well behaved procedure is the transitive closure of well behaved leaf procedures and procedures that only call well behaved leaf procedures. A well behaved leaf procedure is a procedure with no PERFORMs to non-well behaved procedures and no inter-procedure GO Tos.

The super-proc takes two input arguments: 1) the index of the "start paragraph," the paragraph at which to begin execution; and 2) the index of the "return paragraph," the paragraph which returns to the caller upon exit. For a simple PERFORM statement (a PERFORM with a single target) these indices will indicate the same paragraph. For a PERFORM <start> THROUGH <end> statement, the start paragraph index is the first operand and the exit paragraph index is the second operand.

The super-proc is generated after all COBOL code has been processed and paragraph coalescing and procedure slicing have been completed. At this point, paragraphs no longer exist; the set of all paragraphs has been converted into a set of procedures. Therefore, the compiler knows which procedures make use of GO TO and PERFORM statements and the control flow characteristics of the targets of these statements. Under this model, any procedure that has an inter-procedure GO TO is declared to have a return value. The return value is referred to as a "continuation." In the super-proc, a call to such a procedure will be followed by code to check the return value and invoke the enclosing case table logic if it is non-zero. This code transfers control appropriately. Paragraphs that do not make use of inter-procedural GO TO statements will not experience any of the overhead associated with the use of "continuations."

The super-proc can be thought of as a sequential set of procedure calls within an enclosing switch statement. The switch statement is used to support inter-procedure GO Tos between the various primary and alternate entry points within each procedure.

Each primary and alternate entry point within a procedure that is called from the super-proc will be the target of one or more PERFORM statements or GO TO statements. This is a result of the procedure coalescing algorithm of FIG. 3. Each paragraph that has been coalesced into a procedure and which is the target of a PERFORM or an inter-procedure GO TO will have a unique entry in the switch statement.

In the super-proc, any primary or alternate entry point that includes an inter-procedure GO TO will have code to test the return value for a non-0 "continuation" immediately following the call to the primary or alternate entry point. If the "continuation" is non-0, a branch to the beginning of the super-proc is performed which invokes the enclosing switch statement logic and dispatches control flow to the appropriate primary or alternate entry point.

Any primary or alternate entry point that is a potential return point from a PERFORM will have code in the super-proc to test the current "return paragraph" index following the call to the primary or alternate entry point. This code follows any code that may be present to test "continuation" return values. If the "return paragraph" index in the current invocation of the super-proc matches the index of the primary or alternate entry point just executed, then the super-proc returns to its caller which represents in a pop of the conceptual PERFORM stock.

Any primary or alternate entry point that is not a potential return point from a PERFORM will have code in the super-proc to execute a jump to the point in the enclosing switch statement that is the beginning of the next set of coalesced paragraphs. This will be a jump to the beginning of the next procedure. This jump follows any code that may be present to test "continuation" return values. The jump is necessary to avoid incorrectly re-executing code in set of coalesced procedures that would occur by fall-through in the enclosing case statement.

Below is an example of the super-proc logical layout using the C language for clarity. It is a simplistic example that would not occur in this invention. It is provided to illustrate the basic concept of control flow handling with the super-proc:

```
super-proc ()
{
    first_paragraph ();
    second_paragraph ();
    third_paragraph ();
    fourth_paragraph ();
    fifth_paragraph ();
    sixth_paragraph ();
}
```

In the above code fragment, there are six paragraphs and no GO TO statements used in the program. Therefore, neither an enclosing case table nor continuations are used. In fact, this program would result in a single in-line procedure with no control flow due to procedure coalescing, provided that the combined code size of the coalesced paragraphs does not exceed the basic block limit.

Consider the following code fragment:

```
super-proc (next_index, return_index)
{
    alter_flow:
        switch (next_index) {
            case 1: first_paragraph ();
            case 2: second_paragraph ();
            case 3: next_index = third_paragraph ();
                    if (next_index) goto alter_flow;
            case 4: fourth_paragraph ();
                    if (return_index == 4) return;
            case 5: next_index = fifth_paragraph ();
                    if (next_index) goto alter_flow;
                    if (return_index == 5) return;
            case 6: sixth_paragraph ();
        }
}
```

In the above code fragment, note that paragraph_3 makes use of one or more inter-procedural GO TO statements. Paragraph_4 is a potential perform exit point because it is the target of a simple PERFORM or the second operand in a PERFORM THROUGH. Paragraph_5 makes use of one or more inter-procedural GO Tos and is a potential perform exit point.

When an intra-procedure GO TO is performed, an unconditional branch is used. When an inter-procedure GO TO statement is executed to alter control flow, the run-time code performs a return to the super-proc with a "continuation" as a return value which indicates the paragraph or section to which control flow should be given. Any procedure that makes use of an inter-procedure GO TO will include code to return to the super-proc with a "continuation." If such a paragraph terminates normally, a zero "continuation" is returned and the super-proc will invoke the next paragraph in the control flow. If the paragraph terminates with an inter-procedure GO TO, a "continuation" representing the target of the GO TO is returned. The super-proc will then use its alter_flow case table to transfer control flow to the GO TO target.

The code stream graph supports two types of PERFORMs: 1) a "simple" PERFORM, a perform of a single paragraph; and 2) a PERFORM THROUGH, a perform of a contiguous set of paragraphs. The more complex forms of PERFORM, such as PERFORM ... VARYING, are reduced to either simple PERFORMs or PERFORM THROUGHs in the code stream graph with the addition of extra instructions to implement the logic for loops.

A PERFORM THROUGH is handled by a call to the super-proc with the start and end indices as the first and second arguments, respectively. A PERFORM THROUGH statement targeting a set of paragraphs that has been coalesced into a well-behaved procedure will be a direct call to the appropriate paragraph entry point.

Under the present invention, the PERFORM stack is implemented with the standard system stack. A simple PERFORM to a paragraph entry point in a well-behaved procedure is implemented as a direct procedure call. Any other simple PERFORM is implemented as a call tp the super-proc with the same start and end paragraph indices.

Although the present invention and its advantages have been described in detail, it should be understood that various changes, substitutions and alterations can be made herein without departing from the spirit and scope of the invention as defined by the appended claims.

What is claimed is:

1. A compiler adapted for execution on a computer system having a memory, the compiler comprising:

means executing on the computer system, for reading a source program from the memory, the source program comprised of a plurality of paragraphs, each paragraph having a plurality of instructions, the instructions defining a control flow;

means for coalescing the plurality of paragraphs to produce coalesced procedures;

means for slicing instructions from the coalesced procedures to produce sliced procedures;

means for generating a super-proc from the sliced procedures, wherein a call to the super-proc implements the control flow.

2. The compiler of claim 1, wherein the means for coalescing comprises:

means for determining whether a paragraph is a potential return point;

means for coalescing the paragraph into a first current procedure if the paragraph is not a potential return point;

means for creating a second current procedure containing the paragraph if the paragraph is a potential return point.

3. The compiler of claim 2, wherein the means for coalescing the paragraph into the first current procedure comprises:

means for reclassifying a primary entry point of the first current procedure as an alternate entry point;

means for altering the first current procedure to indicate that the first current procedure contains the paragraph;

means for marking the paragraph as the primary entry point of the first current procedure.

4. The compiler of claim 1, wherein the means for slicing comprises:

means for estimating a number of basic blocks in a coalesced procedure;

means for removing instructions from the coalesced procedure and placing the removed instructions in a new procedure if the estimated basic block count is above a predetermined limit;

means for replacing the removed instructions in the coalesced procedure with a call to the new procedure.

5. The compiler of claim 4, wherein the means for estimating comprises:

a table containing a basic block value estimate for each instruction;

means for looking up an instruction in the table to determine the instruction's basic block value estimate.

6. The compiler of claim 1, wherein the super-proc comprises sequential calls to each entry point in each sliced procedure.

7. The compiler of claim 1, wherein the super-proc accepts a first argument indicating a start paragraph and a second argument indicating a return paragraph.

8. The compiler of claim 1, wherein the super-proc comprises:

means for implementing an intra-paragraph GO TO statement as an unconditional jump;

means for implementing an inter-procedure GO TO statement as a return to the super-proc with a continuation indicating a paragraph to which control should be transferred;

means for implementing a first PERFORM statement as a direct call to a well-behaved procedure;

means for implementing a second PERFORM statement as a call to the super-proc.

9. A method of compiling a source program stored in a memory of a computer system, the source program comprised of a plurality of paragraphs, each paragraph having a plurality of instructions, the instructions defining a control flow, the method comprising the steps of:

coalescing the plurality of paragraphs to produce coalesced procedures;

slicing instructions from the coalesced procedures to produce sliced procedures;

generating a super-proc from the sliced procedures, wherein a call to the super-proc implements the control flow.

10. The method of claim 9, wherein the coalescing step comprises the steps of:

determining whether a paragraph is a potential return point;

coalescing the paragraph into a first current procedure if the paragraph is not a potential return point;

creating a second current procedure containing the paragraph if the paragraph is a potential return point.

11. The method of claim 10, wherein the step of coalescing the paragraph into the first current procedure comprises the steps of:

reclassifying a primary entry point of the first current procedure as an alternate entry point;

altering the first current procedure to indicate that the first current procedure contains the paragraph;

marking the paragraph as the primary entry point of the first current procedure.

12. The method of claim 9, wherein the slicing step comprises the steps of:

estimating a number of basic blocks in a coalesced procedure;

removing instructions from the coalesced procedure and placing the removed instructions in a new procedure if the estimate is above a predetermined limit;

replacing the removed instructions in the coalesced procedure with a call to the new procedure.

13. The method of claim 12, wherein the estimating step comprises the step of:

looking up an instruction in a table to determine the instruction's basic block value estimate.

14. The method of claim 9, wherein the super-proc comprises sequential calls to each entry point in each sliced procedure.

15. The method of claim 9, wherein the super-proc accepts a first argument indicating a start paragraph and a second argument indicating a return paragraph.

16. The method of claim 9, wherein the generating step comprises the steps of:

implementing an intra-paragraph GO TO statement as an unconditional jump;

implementing an inter-procedure GO TO statement as a return to the super-proc with a continuation indicating a paragraph to which control should be transferred;

implementing a first PERFORM statement as a direct jump to a well-behaved procedure;

implementing a second PERFORM statement as a call to the super-proc.

17. A computer program product having a computer readable medium having computer program logic recorded thereon for optimizing a source program on a computer system having a memory, the computer program product comprising:

means executing on the computer system for reading the source program from the memory, the source program comprised of a plurality of paragraphs, each paragraph having a plurality of instructions, the instructions defining a control flow;

means for coalescing the plurality of paragraphs to produce coalesced procedures;

means for slicing instructions from the coalesced procedures to produce sliced procedures;

means for generating a super-proc from the sliced procedures, wherein a call to the super-proc implements the control flow.

18. The computer program product of claim 17, wherein the means for coalescing comprises:

means for determining whether a paragraph is a potential return point;

means for coalescing the paragraph into a first current procedure if the paragraph is not a potential return point;

means for creating a second current procedure containing the paragraph if the paragraph is a potential return point.

19. The computer program product of claim 18, wherein the means for coalescing the paragraph into the first current procedure comprises:

means for reclassifying a primary entry point of the first current procedure as an alternate entry point;

means for altering the first current procedure to indicate that the first current procedure contains the paragraph;

means for marking the paragraph as the primary entry point of the first current procedure.

20. The computer program product of claim 17, wherein the means for slicing comprises:

means for estimating a number of basic blocks in a coalesced procedure;

means for removing instructions from the coalesced procedure and placing the removed instructions in a new procedure if the estimate is above a predetermined limit;

means for replacing the removed instructions in the coalesced procedure with a call to the new procedure.

* * * * *